United States Patent
Seshadri et al.

(10) Patent No.: US 8,335,970 B2
(45) Date of Patent: Dec. 18, 2012

(54) ENCODER/DECODER WITH UNFOLDING ERROR CORRECTION

(75) Inventors: Nambirajan Seshadri, Irvine, CA (US); Ba-Zhong Shen, Irvine, CA (US); Tsung-Yi Chen, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 511 days.

(21) Appl. No.: 12/632,442

(22) Filed: Dec. 7, 2009

(65) Prior Publication Data

US 2011/0078527 A1 Mar. 31, 2011

Related U.S. Application Data

(60) Provisional application No. 61/246,314, filed on Sep. 28, 2009.

(51) Int. Cl.
*H03M 13/00* (2006.01)
(52) U.S. Cl. ...................................... 714/776
(58) Field of Classification Search ............... 714/776
See application file for complete search history.

(56) References Cited

U.S. PATENT DOCUMENTS

| | | | | |
|---|---|---|---|---|
| 6,081,918 | A * | 6/2000 | Spielman | 714/746 |
| 6,912,686 | B1 * | 6/2005 | Rodriguez et al. | 714/799 |
| 7,865,813 | B2 * | 1/2011 | Spencer et al. | 714/790 |
| 2003/0200499 | A1 * | 10/2003 | Khayrallah | 714/776 |
| 2010/0011275 | A1 * | 1/2010 | Yang | 714/755 |
| 2010/0061287 | A1 * | 3/2010 | Josiam et al. | 370/312 |

* cited by examiner

*Primary Examiner* — Scott Baderman
*Assistant Examiner* — Joseph Kudirka
(74) *Attorney, Agent, or Firm* — Garlick & Markison; Timothy W. Markison; Jessica W. Smith

(57) ABSTRACT

A decoder includes an interface and a processing module. The interface receives first data, redundant data of the first data, second data, redundant data of the second data, and combined redundant data. The processing module decodes the first data based on the redundant data of the first data, decodes the second data based on the redundant data, of the second data and verifies the decoding of the first and second data. When the first data is decoded successfully and the second data is not, the processing module encodes the first data to produce a second redundant data of the first data, determines a second redundant data of the second data based on the combined redundant data and the second redundant data of the first data, decodes the second data based on the second redundant data of the second data, and verifies the decoding of the second data.

20 Claims, 9 Drawing Sheets

ENCODER/DECODER WITH UNFOLDING ERROR CORRECTION

CROSS REFERENCE TO RELATED PATENTS

This invention claims priority under 35 USC §119(e) to a provisionally filed patent application having the same title as the present patent application, a filing date of Sep. 28, 2009, and an application No. of 61/246,314.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to wireless communications within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers data from the filtered signals in accordance with the particular wireless communication standard.

As is also known, the transmitter includes a data modulation stage, one or more intermediate frequency stages, and a power amplifier. The data modulation stage converts data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Whether wireless communication devices communicate directly or indirectly, the wireless communication channel, or channels, supporting the communication introduce errors that, if left uncorrected, would compromise the integrity of the communication (e.g., packets are corrupted). The errors may result from one or more of noise, interference, path loss, multi-path fading, etc.

One solution to address the errors introduced by the channel(s) is to require the receiving device to acknowledge receipt of each packet. If a packet is not acknowledged, or the receiver requests a re-send, the transmitter resends the packet. While this addresses the error issue, it does so at the cost of reduced data throughput as a result of sending the packet one or more additional times plus it is difficult to use for real time communications (e.g., cellular voice communications).

Another solution is to use an error correction scheme (e.g., forward error correction, error-correcting code, etc.) where the data modulation stage of the transmitter encodes packets of data with corresponding error correction codes. On the receiver side, the data recovery stage uses, in a one-to-one relationship, an error correction code to recover data from the corresponding packet. As such, a packet with errors can be corrected without having to retransmit the packet based on the corresponding error correction code. If, however, the errors introduced by the channel exceed the capabilities of the error correction scheme, then the packet is lost or it has to be retransmitted. Neither is a desirable situation.

Therefore, a need exists for an encoder/decoder that provides a more robust error correction scheme.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
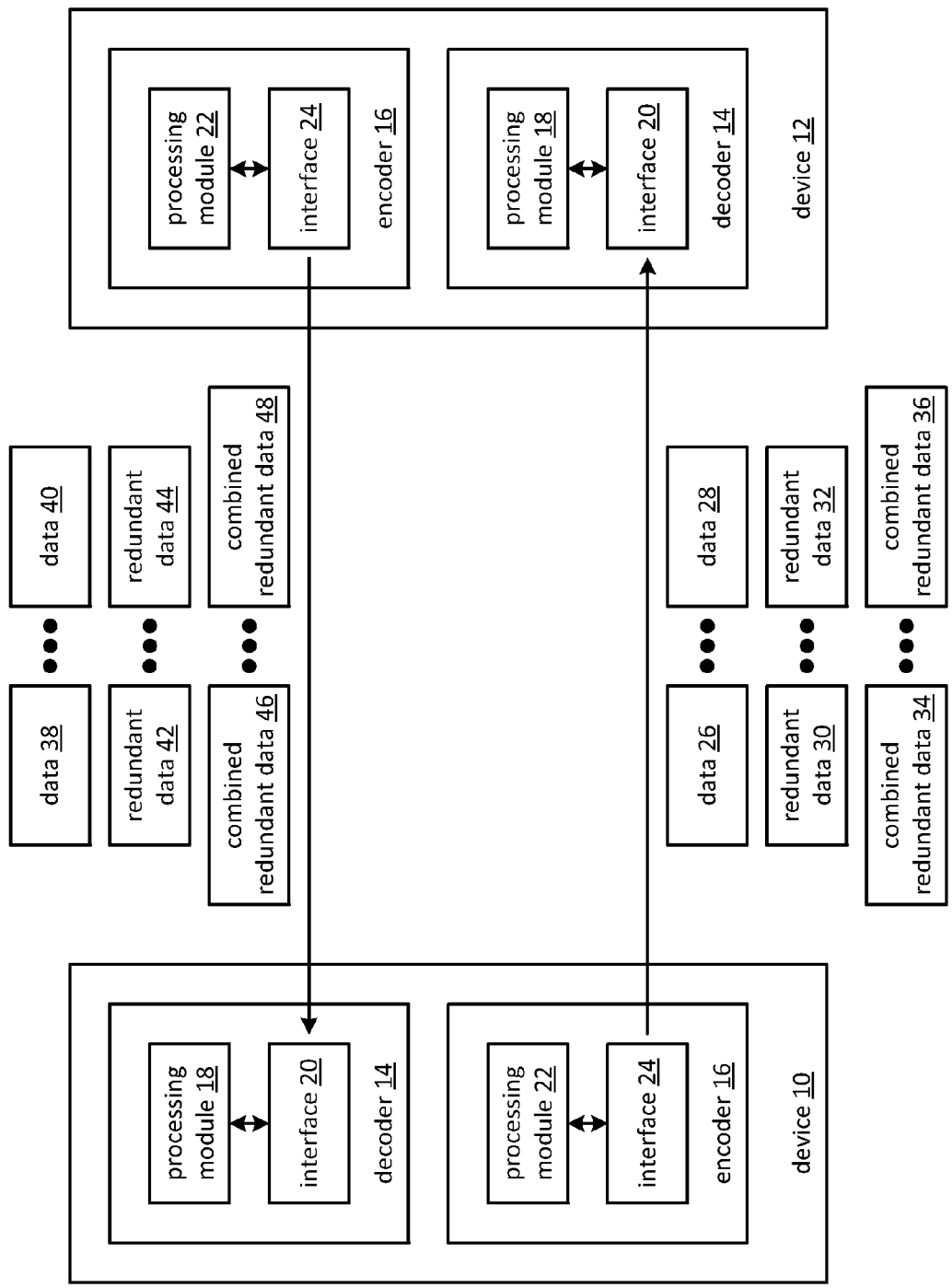
FIG. 1 is a schematic block diagram of an embodiment of a communication between two devices in accordance with the present invention.

FIG. 1 is a schematic block diagram of an embodiment of a communication between two devices 10 and 12 over a lossy channel, which may be one or more wireless channels and/or one or more lossy-wired channels. The communication devices 10-12 may be portable communication devices and/or fixed communication devices. For example one of the communication devices may a portable communication device (e.g., cellular telephone, laptop computer, video gaming device, personal multimedia player, etc.) and the other device may be a fixed communication device (e.g., a base station, a femtocell base station, an access point, etc.). As another example, both communication devices may be portable communication devices or both may be fixed communication devices.

Each of the communication devices 10 and 12 includes an encoder 16 and a decoder 14. The encoder 16 includes a processing module 22 and an interface 24. The decoder 14 includes a processing module 18 and an interface 20. The processing modules 18 and 22 of the decoder 14 and encoder 16 of a device 10-12 may be the same processing module or separate processing modules. A processing module 18, 22 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-9.

The interface 20 of the decoder 14 and the interface 24 of the encoder 16 may be a shared interface or separate interfaces. The construct of the interface 20, 24 is dependent upon the type of channel over which the communication devices 10 and 12 are communicating and the protocol used for the communication. For example, if the channel is a wireless channel, the interface 20 may include a radio frequency (RF) and/or millimeter wave (MMW) receiver that is operable to receive an inbound wireless signal and convert it into an inbound baseband signal in accordance with one or more wireless communication standards (e.g., IEEE 802.11xx, Bluetooth, ZigBee, GSM, CDMA, WCDMA, EDGE, GPRS, LTE, WiMAX, HSUPA, HSDPA, etc.). The interface 24 may include an RF and/or MMW transmitter that is operable to convert an outbound baseband signal into an outbound wireless signal in accordance with the one or more wireless communication standards.

In an example of operation, the communication devices 10-12 have established a communication over a channel (e.g., one or more wireless channels) in accordance with one or more communication standards. For communication content (e.g., voice data, audio data, video data, a text message, graphics data, and/or a combination thereof), the processing module 22 of the encoder 16 encodes the content data to produce data, redundant data, and combined redundant data. Via the interface 24, the encoder 16 transmits data 26-28, 38-40, redundant data 30-32, 42-44, and combined redundant data 34-36, 46-48 as individual packets, as sub-packets, and/or as a stream of data in packets to the decoder 14 of the other device.

In this example, the processing module 22 encodes the content using an error-correcting code (ECC) scheme and/or forward error correction (FEC) scheme to create data (e.g., the raw data of the content data) and corresponding packets of redundant data. For instance, the processing module 22 may implement a convolution encoder and/or block encoder to generate the data and redundant data (e.g., first and second redundant data or parity data). The processing module 22 generates combined redundant data from two or more redundant data elements. As a further example, the processing module may generate a plurality of redundant data for data using the same or different ECC and/or FEC scheme. In addition, the processing module 22 may generate a plurality of combined redundant data elements from two or more pluralities of the redundant data. Note that these functions of the processing module 22 will be discussed in greater detail with reference to FIGS. 2, 4, and/or 6.

The interface 24 converts the packets (sub-packets, or stream of data in packets) into transmission packets in accordance with the one or more communication standards (e.g., IEEE 802.11xx, Bluetooth, ZigBee, GSM, CDMA, WCDMA, EDGE, GPRS, LTE, WiMAX, HSUPA, HSDPA, etc.). As shown, the transmission packets include the data 26-28, 38-40, the redundant data 30-32, 42-44, and the combined redundant data 34-36, 46-48. Note that the transmission packets include the same data content as the packets created by the processing module 22, but may include additional overhead information for the transmission and/or may have a different carrier frequency to facilitate the transmission.

The interface 20 of the decoder 14 receives the transmitted data 26-28, 38-40, the transmitted redundant data 30-32, 42-44, and the transmitted combined redundant data 334-36, 46-48 via the channel. The interface 20 essentially performs the reverse process of interface 24 to produce received data, received redundant data, and the received combined redundant data. The processing module 18 decodes the received data based on their corresponding redundant data (e.g., Viterbi decoding for convolutional encoding). If the decoding is successful, the processing module 18 ignores the received combined redundant data.

If, however, the decoding of a received packet (e.g., data and redundant data) is not successful, the processing module 18 utilizes a corresponding one of the received combined redundant data to decode the previously unsuccessfully decoded packet. For example, since the combined redundant data is based on two or more redundant data, the processing module identifies the other encoded packet(s) corresponding to the combined redundant data. The processing module 18 then determines whether one of the identified other data was decoded successfully. If yes, the processing module encodes the successfully decoded packet to recreate the redundant data for the packet. The processing module processes the combined redundant data in light of the recreated redundant data to recreate second redundant data for the previously unsuccessfully decoded packet. The processing module uses the recreated second redundant data to decode the previously unsuccessfully decoded packet.

In this manner, a more robust fault-tolerant scheme is provided without requiring acknowledgements and retransmissions and without a corresponding increase in the transmit data to the ability to successfully decode packets. For example, with a conventional convolutional encoding scheme where the redundant data includes the same number of bits as the encoded packet, the code rate is ½. In the present example, if the combined redundant data includes the same number of bits as the encoded packet and the redundant data, the code rate is ⅖, yet the ability to decode a packet is doubled. As such, for this example, a 25% increase in transmit data, provides a 100% increase in the ability to decode packets.

Figure 2:
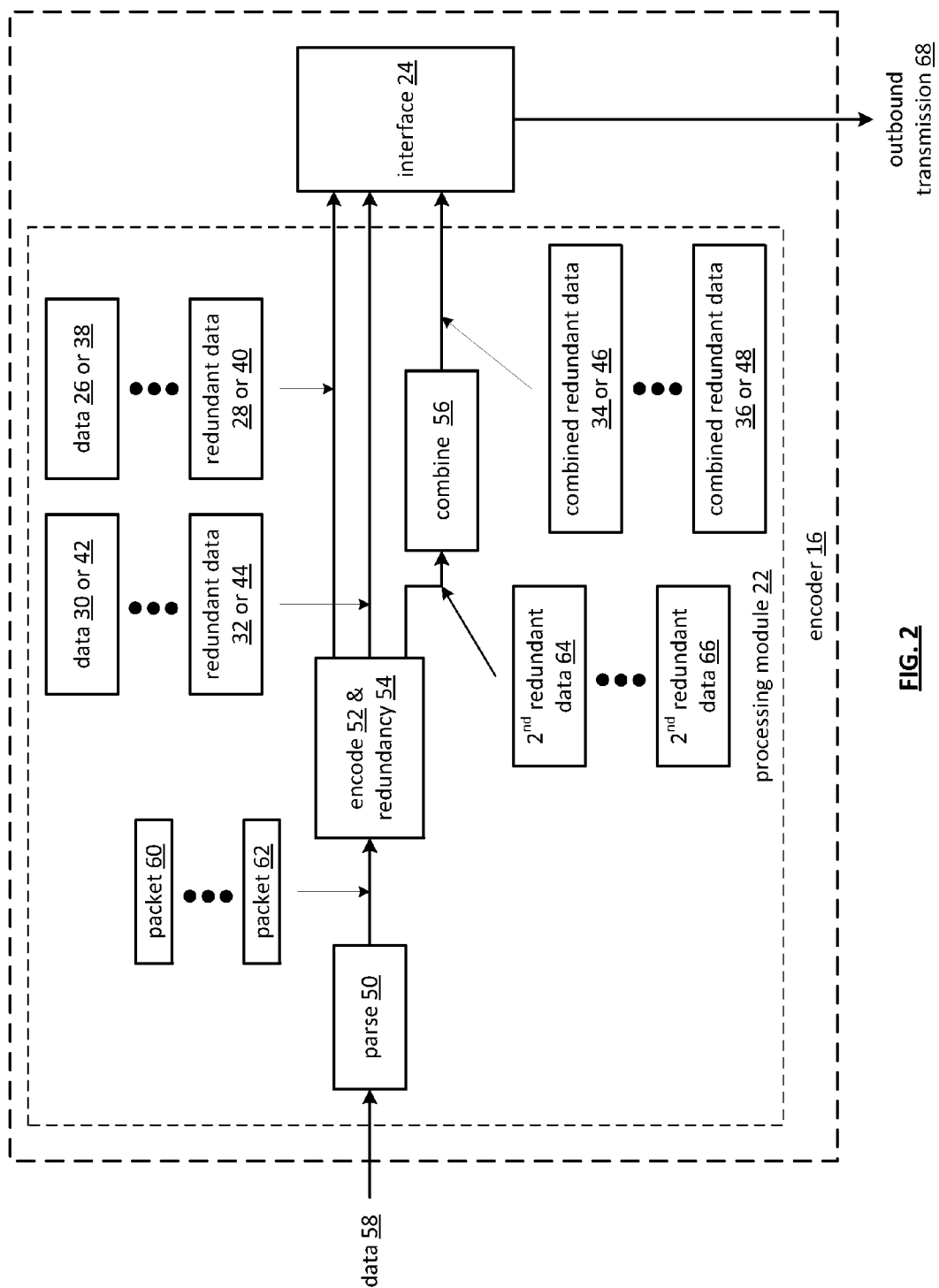
FIG. 2 is a schematic block diagram of an embodiment of an encoder in accordance with the present invention.

FIG. 2 is a schematic block diagram of an embodiment of an encoder 16 that includes the processing module 22 and the interface 24. The processing module 22 may be configured to provide a parsing module 50, an encode 52 & redundancy 54 function, and a combine function 56.

In an example of operation, the parsing module 50 parses data 58 (e.g., audio signals, voices, signals, text data, video signals, video graphics data, etc.) into a plurality of packets 60-62. Each packet includes an overhead section and a data payload section, which are formatted and populated in accordance with one or more communication standards being supported by the device. In general, the encoding 52 and redundant 54 functional block encodes, and generates redundant data for, each packet 60-62 to produce a plurality of data 26-28, 38-40, a plurality of corresponding redundant data 30-32, 42-44, and a plurality of combined redundant data 64-66.

As an example of systematic encoding, the encoding 52 and redundancy 54 functional block encodes a first packet of the plurality of packets 60-62 to produce first data (e.g., 26, which may include the raw data of the payload of the first packet) and generates a first redundant data (e.g., 30, which may be at least a partial redundancy packet corresponding to the raw payload data of the first packet) and a second redundant data (e.g., 64, which may be at least a partial redundancy packet corresponding to the raw payload data of the first packet).

Continuing with this example, the encoding 52 and redundancy 54 functional block also encodes a second packet of the plurality of packets to produce second data (e.g., 28) and generates first and second redundant data (e.g., 32 and 66). Note that the second redundant data 64-66 may be a copy of the redundant data (e.g., 30-32) or may be separately created redundant data using the same redundancy encoding scheme or a different redundancy encoding scheme as used to create the redundant data. Further note that the present concepts may be utilized for non-systematic encoding.

In an embodiment, the encoding 52 and redundancy 54 functional block may be a systematic forward error correction (FEC) module that generates the first and second redundant data from the data content. For instance, the encoding 52 and redundancy 54 functional blocks may be a block coding FEC module or a convolutional coding FEC module. A block coding FEC module may be based on Reed-Solomon coding, Golay coding, BCH (Bose, Chaudhuri, & Hocquenghem) coding, Multidimensional parity coding, and/or Hamming coding. In another embodiment, the encoding 52 and redundancy 54 functional blocks may be based on low-density parity-check (LDPC) codes and/or turbo codes.

The encoding 52 and redundancy 54 functional block provides the data 26-28, 38-40 and the redundant data 30-32, 42-44 to the interface 24 and provides the second redundant data 64-66 to the combine block 56. Note that the delineation between an encoded packet and its corresponding redundant data may be clear (e.g., each are treated as separate packets for transmission and reception) or may be ambiguous (e.g., the encoded packet and the corresponding redundant data are transmitted as one or more packets regarding an un-encoded packet 60-62).

The combine 56 block generates a combined redundant data (e.g., 34) based on the second redundant data (e.g., 64 and 66) of the first and second data. In an embodiment, the combining may be done by an exclusive OR function.

The interface 24 transmits the data 26-28, 38-40, the redundant data 30-32, 42-44, and the combined redundant data 34-36, 46-48 as an outbound transmission 68. In an embodiment, the interface 24 may include a radio frequency (RF) transmitter convert the first encoded packet, the first redundant data, the second encoded packet, the second redundant data, and the combined redundant data into outbound RF signals (e.g., the outbound transmission 68) and transmits it.

Figure 3:
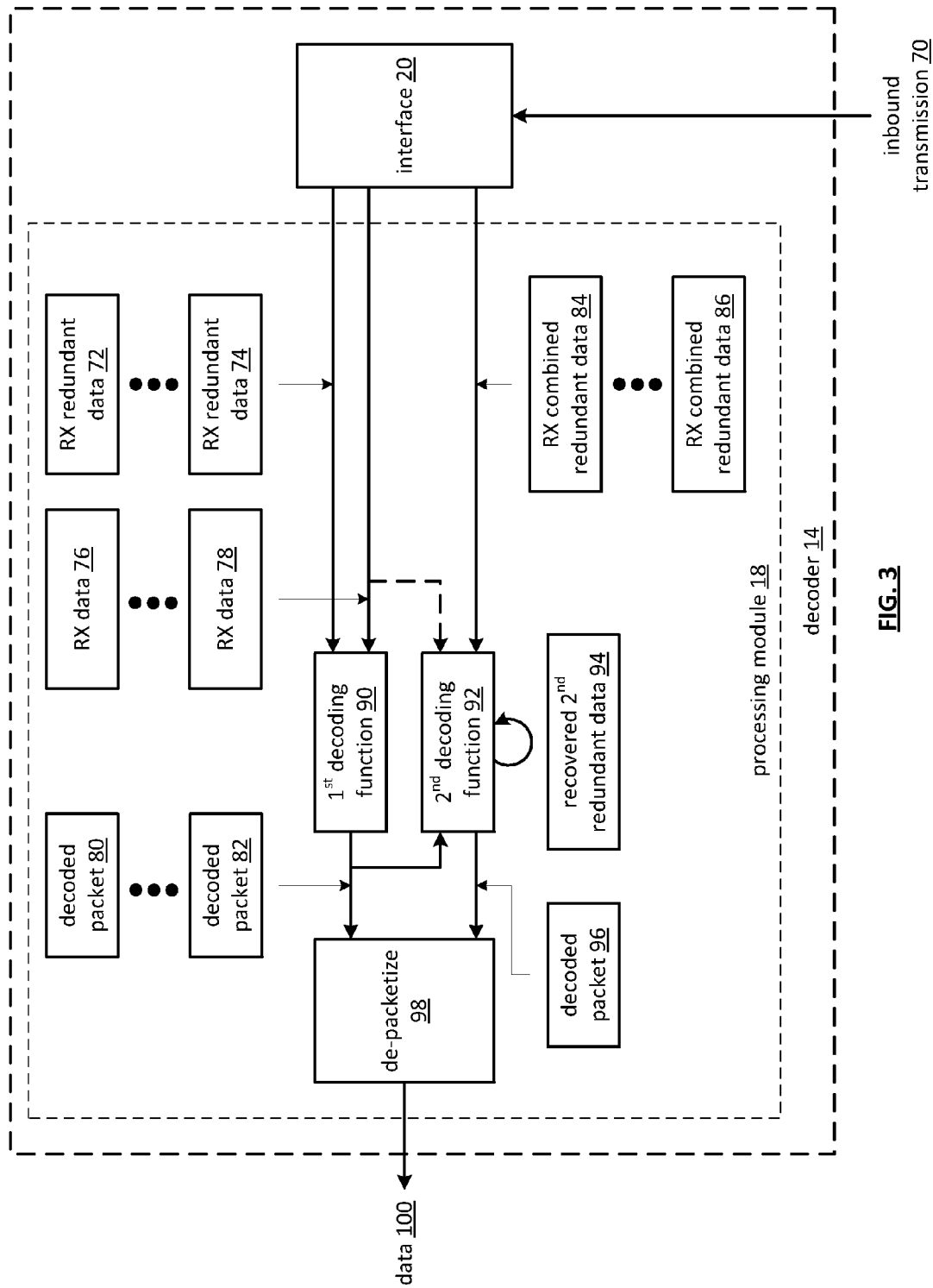
FIG. 3 is a schematic block diagram of an embodiment of a decoder in accordance with the present invention.

FIG. 3 is a schematic block diagram of an embodiment of a decoder 14 that includes the processing module 18 and the interface 20. The processing module 18 implements a first decoding function 90, a second decoding function 92, and a de-packetizing function 98. The interface 20 receives an inbound transmission 70, which is a received version of the outbound transmission 68. The inbound transmission 70 includes a plurality of received data 72-74, a plurality of received (RX) redundant data packets 76-78, and a plurality of received combined redundant data packets 84-86. Note that due to the properties of the channel, the received packets 72-78 and 84-86 may include errors, which, as long as the quantity of errors is less than the number of correctable errors, are correctable.

The interface 20 provides the received data 72-74 and the received redundant data 76-78 to the first decoding function 90. The first decoding function 90 decodes, on a packet-bypacket basis, the received data based on their corresponding received redundant data. For example, if the encoding and redundancy are done via convolutional encoding, then the first decoding function 90 may perform a soft-decision and/or hard-decision Viterbi decoding function. Note that as long as the errors within a received encoded packet 72-74 are less than the error correction threshold of the first decoding function 90, the first decoding function 90 will successfully decode the packets to produce a plurality of decoded packets 80-82.

If, however, the error threshold is exceeded for a packet (e.g., the first decoding function was not successful in decoding the packet), the second decoding function 92 is engaged to decode the unsuccessfully decoded packet. In an embodiment, the second decoding function 92 encodes one of the successfully decoded packets to create a recovered second redundant data of the successfully decoded packet. Note that the particular decode packet being encoding corresponds to the partnering packet of combined redundant data. For example, if second redundant data of an i-th packet and k-th packet of the packets 60-62 were combined to produce the relevant combined redundant data and the i-th packet was successfully decoded and the k-th packet was not successfully decoded, then the second decoding function encodes the i-th packet to recreate the i-th second redundant data.

The second decoding function 92 then recreates the second redundant data 94 for the unsuccessfully decoded packet based on the recovered second redundant data and the corresponding combined redundant data (e.g., one of the received combined redundant data 84-86). The second decoding function 92 then utilizes the recovered second redundant data 94 (and the corresponding received redundant data) to decode the previously unsuccessfully decoded packet to produce a decoded packet 96.

The de-packetizing module 98 converts the decoded packets 80-82, 96 into recovered data 100. As such, the de-packetizing module 98 performs an inverse function of the parsing module 50 of the encoder 50.

Figure 4:
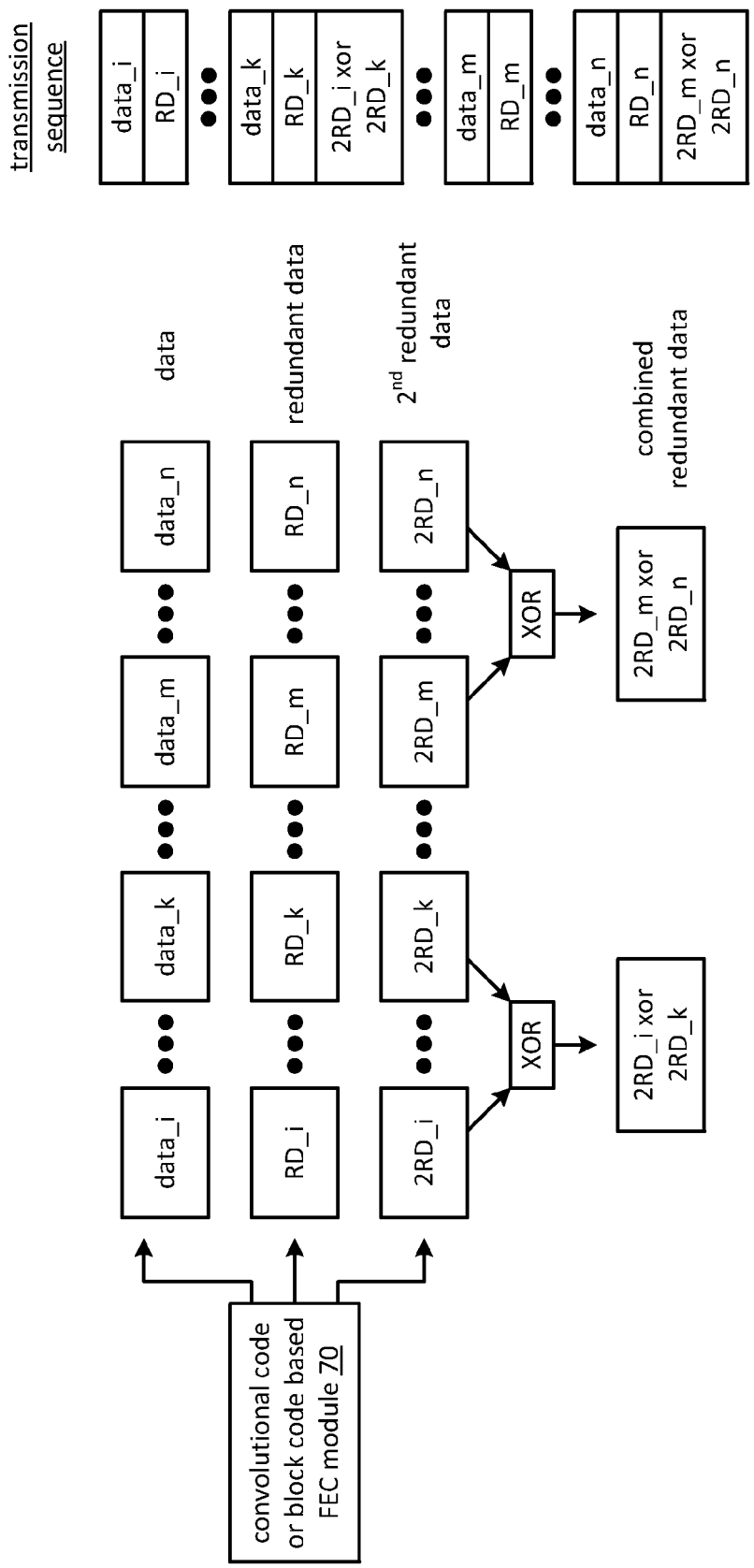
FIG. 4 is a functional diagram of an example of encoding in accordance with the present invention.

FIG. 4 is a functional diagram of an example of encoding by the encoder 16 using a convolution code or block code based forward error correction (FEC) module 70. In this example, the FEC module 70 functions in a conventional manner to create a plurality of data (e.g., data_i, data_k, data_m, and data_n) and a corresponding plurality of redundant data (e.g., RD_i, RD_k, RD_m, and RD_n). In addition, the FEC module 70 creates a corresponding plurality of second redundant data (2RD_i, 2RD_k, 2RD_m, and 2RD_n). The corresponding plurality of second redundant data may be a copy of the plurality of redundant data or the FEC module 70 may create them separately by using the same FEC function and/or a different FEC function as it used to create the plurality of redundant data.

To create the combined redundant data, the encoder 16 includes a plurality of exclusive OR modules (XOR). As shown, an XOR exclusively OR's one second redundant data (e.g., 2RD_i) with another second redundant data (e.g., 2RD_k) to produce a combined redundant data (e.g., 2RD_i XOR 2RD_k). Note that the packets used to create a combined redundant data may be adjacent packets or they may non-adjacent packets. In this manner, two second redundant data are transmitted in one packet, thus reducing the amount of data being transmitted, yet providing double the chances or correctly decoding a packet.

As is further shown in FIG. 4, the encoder 16 provides the packets in an order for transmission. For instance, the transmission sequence may begin with the first data packet (data_i) and its corresponding redundant data (RD_i). The sequence continues with the second data packet (data_k) and its corresponding redundant data (RD_k). The sequence continues by transmitting the combined redundant data of the second redundant data for the first and second data (2RD_i XOR 2RD_k). The sequence continues with the third data packet (data_m); its corresponding redundant data (RD_m), the fourth encoded packet (data_n); and its corresponding redundant data (RD_n). The sequence continues by transmitting the combined redundant data of the second redundant data for the third and fourth data (2RD_m XOR 2RD_n). Note that there may be other packets transmitted between the packets shown.

Figure 5:
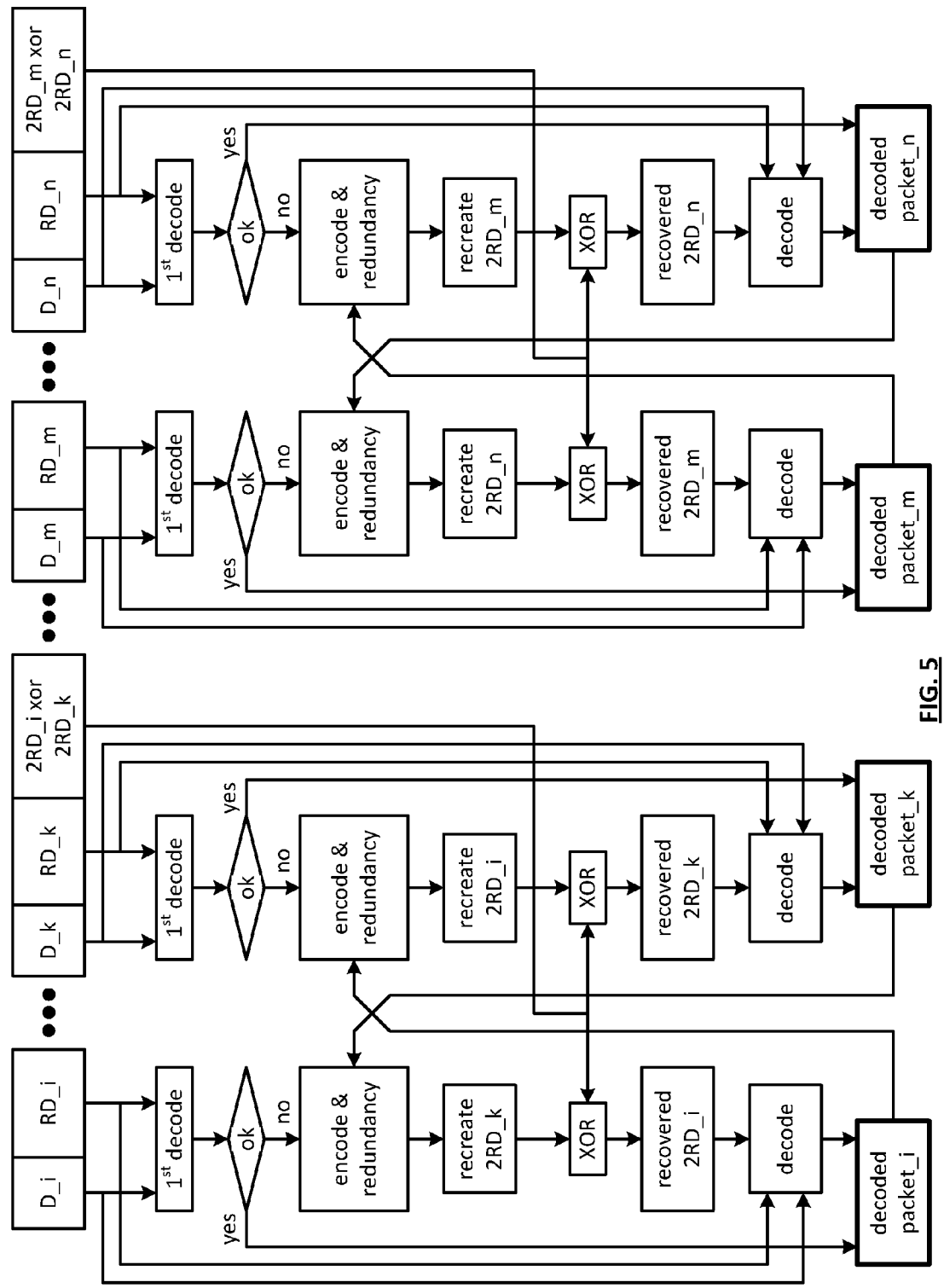
FIG. 5 is a functional diagram of an example of decoding in accordance with the present invention.

FIG. 5 is a functional diagram of an example of decoding the data of FIG. 4. In this example, the decoder 14 receives the packets in the order transmitted by the encoder 16 (via the corresponding interfaces 20 and 24). As such, the decoder receives D_i, RD_i, . . . D_k, RD_k, 2RD_i XOR 2RD_k, . . . D_m, RD_m, . . . D_n, RD_n, and 2RD_m XOR 2RD_n. After the decoder receives a data packet (e.g., D_i) and its redundant data (RD_i), it attempts to decode the data based on its redundant data using the first decoding (e.g., Viterbi decoding). If the decoding was successful, the decoder outputs a decoded packet (e.g., decoded packet_i). The verification of the decoding may be an inherent function of the decoding and/or a separate function. For instance, the inherent and/or separate verification may be done by performing a cyclic redundancy check (CRC), performing a parity check, performing a checksum, performing a Hamming distance based check, performing a hash function, and/or performing an error detection function.

If the decoding was not successful, the decoder continues to store the encoded packet (D_i) and its redundant data (RD_i) and continues decoding other data. When the decoder decodes one of the related packets of the unsuccessfully encoded packet, it again attempts to decode the packet. In this example, the related packet is data packet (D_k). The decoder performs the first decoding function on the related data packet (D_k) based on its redundant data (RD_k). If the decoding is successful, the decoder outputs another decoded packet (e.g., decoded packet_k).

With the related packet successfully decoded, the decoder attempts to decode the previously unsuccessfully decoded packet (e.g., D_i). The decoder begins the second decoding function by encoding and redundancy coding the successfully decoded related packet (e.g., decoded packet_k). From the encoding and redundancy coding, the decoder recreates the second redundant data (2RD_k) of the successfully decoded related packet. The decoder then exclusively ORs the recreated second redundant data (2RD_k) with the combined redundant data (e.g., 2RD_i XOR 2RD_k) to recover the second redundant data (e.g., 2RD_i) of the unsuccessfully decoded packet.

The decoder then decodes the data packet (D_i) based on the recovered second redundant data (2RD_i) to produce the decoded packet_i. The decoding of the data packet based on the recovered second redundant data may be further based on the redundant data (RD_i). A similar process would be followed if data packet (D_i) is successfully decoded and data packet (D_k) is not successfully decoded.

The decoder continues decoding packets to produce decoded packets. For instance, the decoder decodes data D_m and D_n in a manner as discussed with reference to data D_i and D_k.

Figure 6:
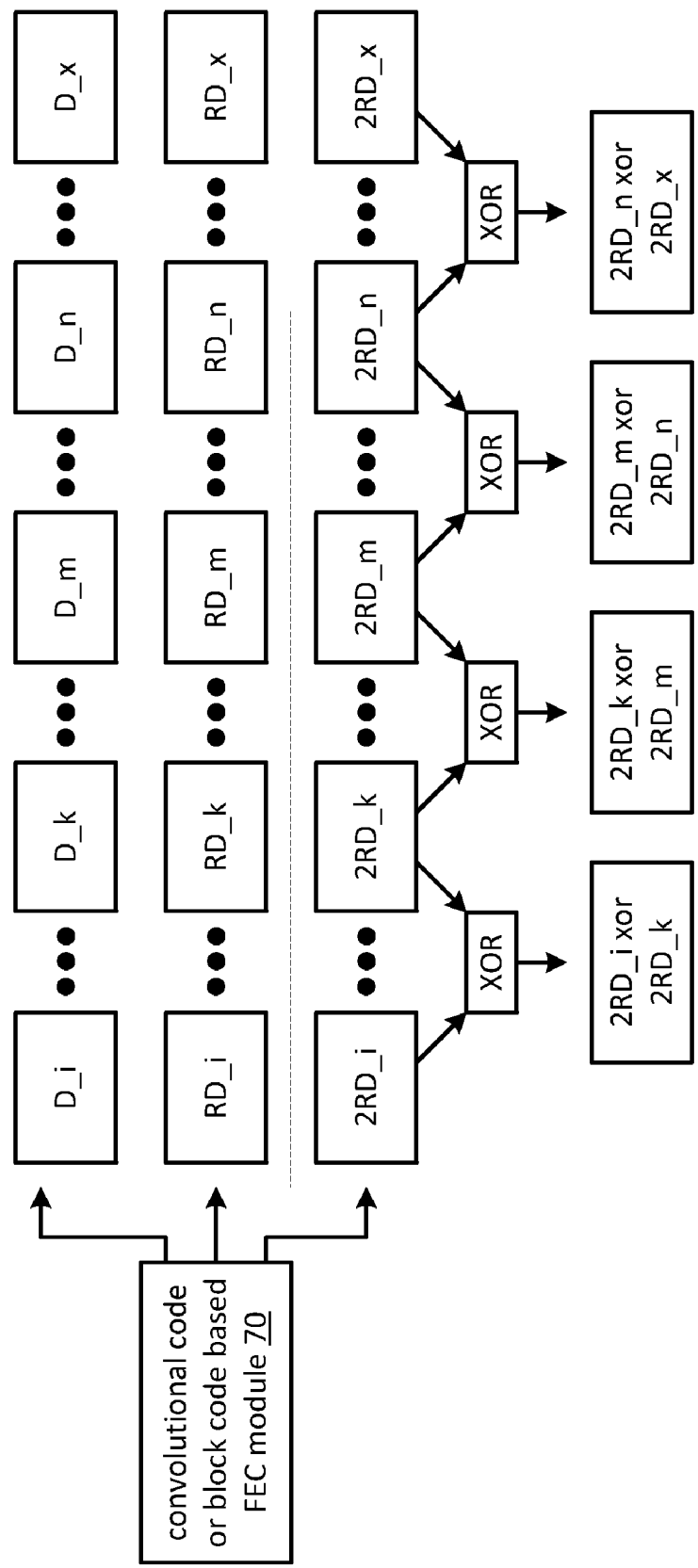
FIG. 6 is a functional diagram of another example of encoding in accordance with the present invention.

FIG. 6 is a functional diagram of another example of encoding by the encoder 16 using a convolution code or block code based forward error correction (FEC) module 70. In this example, the FEC module 70 functions in a conventional manner to create a plurality of data, or data packets, (e.g., D_i, D_k, D_m, and D_n) and a corresponding plurality of redundant data (e.g., RD_i, RD_k, RD_m, and RD_n). In addition, the FEC module 70 creates a corresponding plurality of second redundant data (2RD_i, 2RD_k, 2RD_m, and 2RD_n). The corresponding plurality of second redundant data may be a copy of the plurality of the first redundant data or the FEC module 70 may create them separately by using the same FEC function and/or a different FEC function as it used to create the plurality of redundant data.

To create the combined redundant data, the encoder 16 includes a plurality of exclusive OR modules (XOR). As shown, an XOR exclusively OR's one second redundant data (e.g., 2RD_i) with another second redundant data (e.g., 2RD_k) to produce combined redundant data (e.g., 2RD_i XOR 2RD_k). Note that the packets used to create a combined redundant data may be adjacent packets or they may non-adjacent packets. In this manner, three second redundant data are transmitted in two packets, thus reducing the amount of data being transmitted, yet providing a 3× improvement in the probability of correctly decoding a packet.

While FIGS. 4 and 6 provide examples of encoding the packets to include second redundant data, there are a variety of ways to improve the probability of decoding packets in accordance with the concepts of the present invention. For instance, for each data packet, first and second redundant data are created as well as third and beyond redundant data may be created. The multiple redundant data are exclusively ORed with other multiple redundant data of other data packets. Thus, while lower the code rate, the probability of successfully decoding a packet is enhanced. Note that a packet may be a single bit in size or greater.

Figure 7:
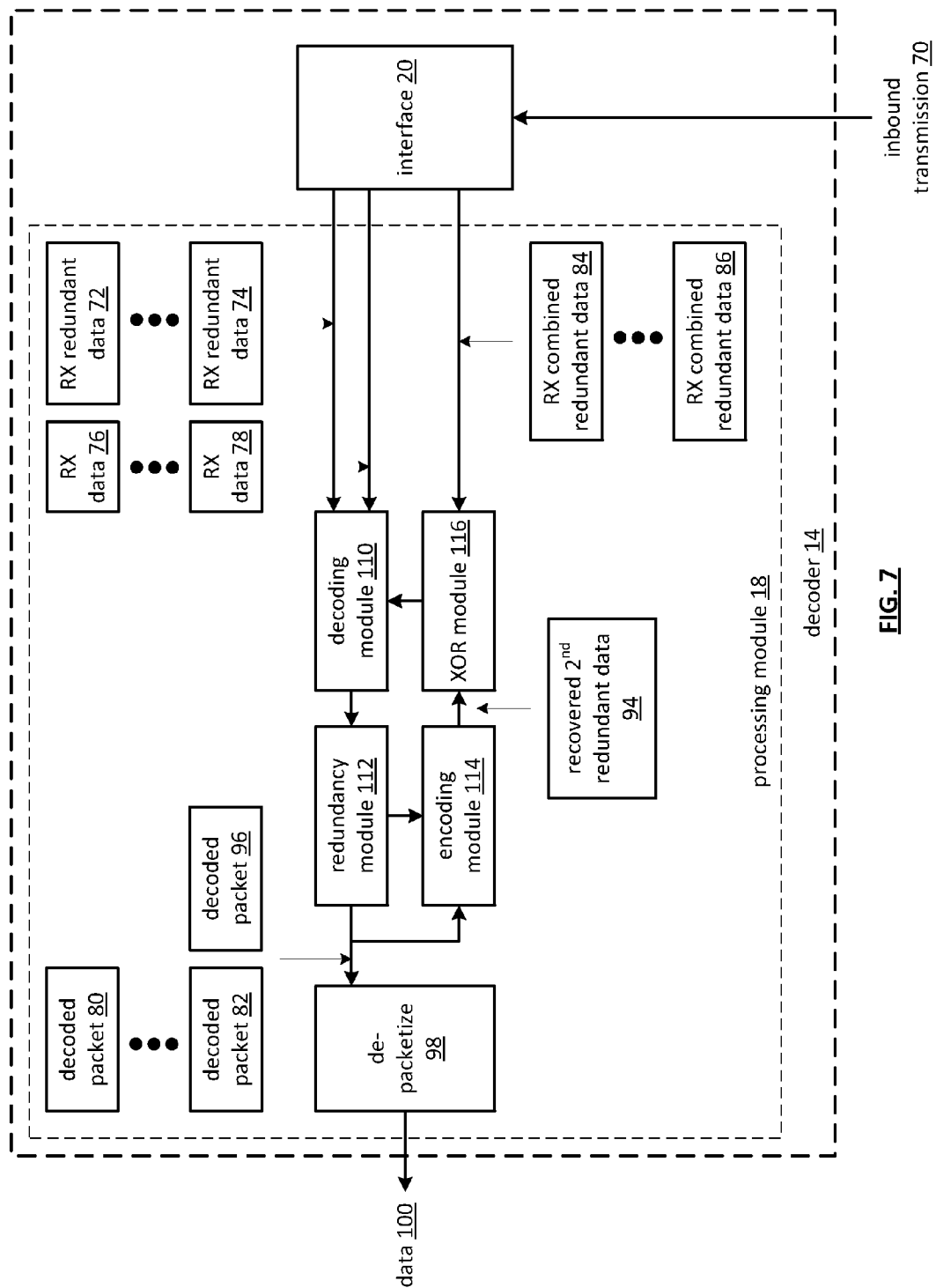
FIG. 7 is a schematic block diagram of another embodiment of a decoder in accordance with the present invention.

FIG. 7 is a schematic block diagram of another embodiment of a decoder 14 that includes the processing module 18 and the interface 20. The processing module 18 implements a decoding module 110, a redundancy module 112, an encoding module 114, an exclusive OR module 116, and the de-packetizing module 98. The interface 20 receives an inbound transmission 70, which is a received version of the outbound transmission 68. The inbound transmission 70 includes a plurality of received data packets (or sub-packets) 72-74, a plurality of received (RX) redundant data packets (or sub-packets) 76-78, and a plurality of received combined redundant data packets (or sub-packets) 84-86. Note that due to the properties of the channel, the received data 72-78 and/or redundant data 84-86 may include errors, which, as long as the quantity of errors is less than the number of correctable errors, are correctable.

The interface 20 provides the received data 72-74 and the received redundant data 76-78 to the decoding module 110. The decoding module 110 decodes the received data based on their corresponding received redundant data. For example, if the encoding and redundancy are done via convolutional encoding, then the decoding module 110 may perform a soft-decision and/or hard-decision Viterbi decoding function. The redundancy module 112 (which may be part of a Viterbi decoder) determines whether the decoding an encoded packet was successful. For example, the redundancy module 112 may perform a cyclic redundancy check (CRC), perform a parity check, perform a checksum, perform a Hamming distance based check, perform a hash function, and/or perform an error detection function to verify the decoding.

If the redundancy module 112 determines that a data packet was successfully decoded, it provides the decoded packet 80-82 to the de-packetizing module 98. If, however, the redundancy module 112 determines that a data packet was not successfully decoded, it flags the unsuccessfully decoded packet and identifies one or more of its related data packets.

The redundancy module 112 then determines whether one of the related data packets has been successfully decoded. When a related data packet has been successfully decoded, the redundancy module 112 forwards a copy of the successfully decoded related packet to the encoding module 114.

The encoding module 114, which performs a similar as the encoding and redundancy module, creates a second redundant data 94 (e.g., 2RD_k). The exclusive OR module 116 exclusively ORs the recovered second redundant data 94 with the corresponding received combined redundant data 84-86 (e.g., 2RD_i XOR 2RD_k) to recreate the second redundant data (e.g., 2RD_i) of the unsuccessfully decoded packet (e.g., D_i).

The decoding module 110 decodes the previously unsuccessfully decoded packet (e.g., D_i) based on the recreated second redundant data (e.g., 2RD_i). The decoding may further be based on the corresponding received redundant data 76-78 (e.g., RD_i). The redundancy module 112 verifies the decoding of the previously unsuccessfully decoded packet. If successful, the redundancy module 112 provides the decoded packet 96 to the de-packetizing module 98.

If the decoding was not successful, the process of encoding a related packet to recover its second redundant data, using it to recreate the second redundant data of the unsuccessfully decoded packet, and re-decoding the packet continues until the packet is successfully decoded or the layers of redundant data are exhausted.

Figure 8:
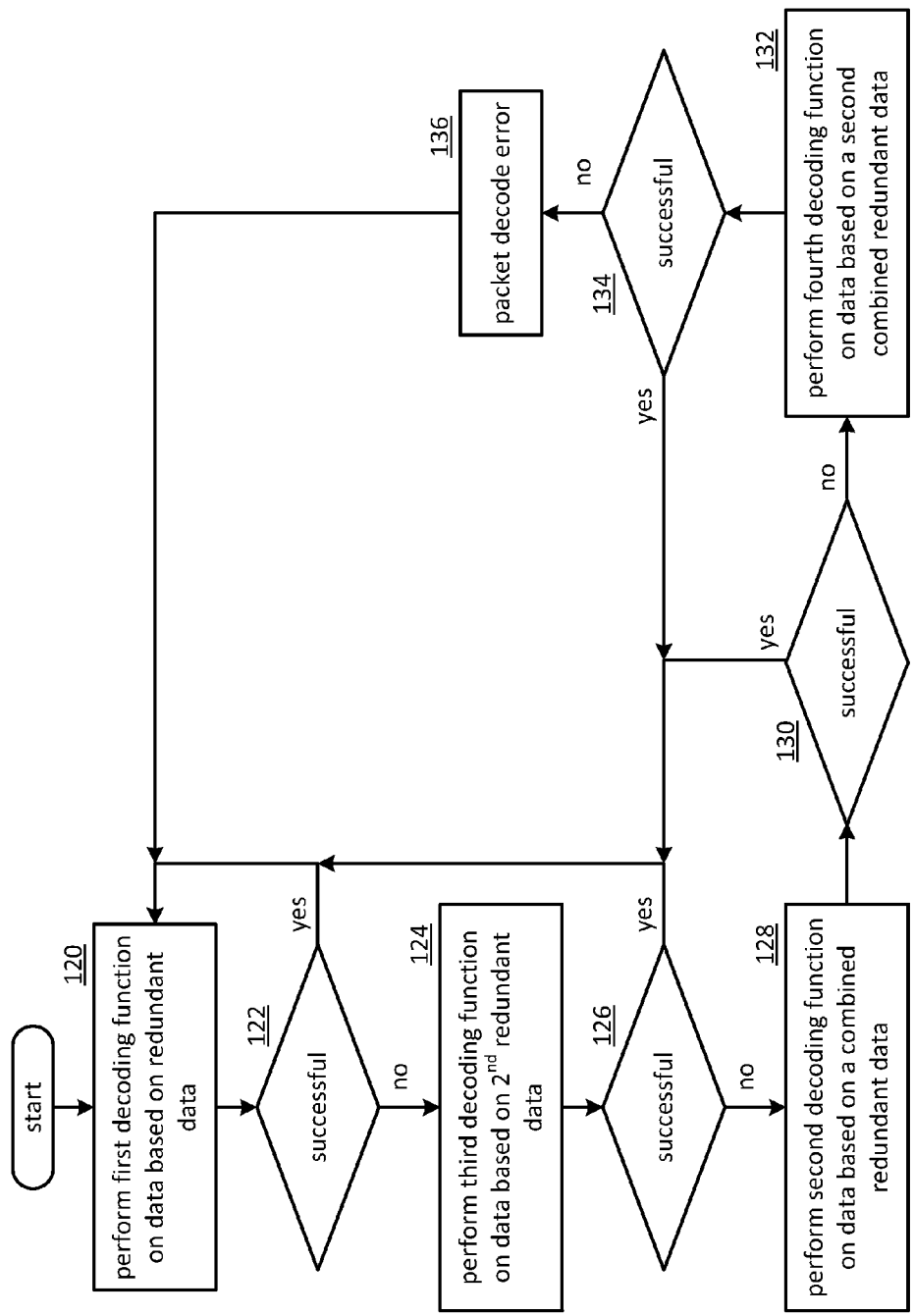
FIG. 8 is a logic diagram of an embodiment of a decoding method in accordance with the present invention.

FIG. 8 is a logic diagram of an embodiment of a decoding method that begins at step 120 where the processing module 18 performs a first decoding function (e.g., Viterbi decoding) on data based on their corresponding redundant data. Examples of the decoding have been previously discussed.

The method continues at step 122 where the processing module determines, on a packet-by-packet basis, whether decoding was successful. If yes, the processing module continues the decoding at step 120. If the decoding of a packet was not successful, the method continues at step 124 where the processing module performs a third decoding function (e.g., Viterbi decoding using a different redundant data) on the unsuccessfully decoded packet based on a corresponding one of a plurality of second redundant data. For example, for each data packet, the encoder may produce redundant data and second redundant data. The second redundant data may be combined with second redundant data of another encoded packet to produce combined redundant data.

The method continues at step 126 where the processing module determines whether the decoding via the third decoding function was successful. If yes, the processing repeats at step 120 for other packets. If the decoding via the third decoding function was not successful, the method continues at step 128 where the processing module performs the second decoding function (e.g., Viterbi decoding using the second redundant data) on the encoded packet based on a corresponding one of the plurality of combined redundant data.

The method continues at step 130 where the processing module determines whether the decoding via the second decoding function was successful. If yes, the processing repeats at step 120 for other packets. If the decoding via the second decoding function was not successful, the method continues at step 132 where the processing module performs a fourth decoding function (e.g., Viterbi decoding using another layer of redundant data) on the encoded packet based on a corresponding one of a plurality of combined redundant data.

The method continues at step 134 where the processing module determines whether the decoding via the fourth decoding function was successful. If yes, the processing repeats at step 120 for other packets. If not, a packet decode error is generated and the method continues at step 120 for the other packets.

Figure 9:
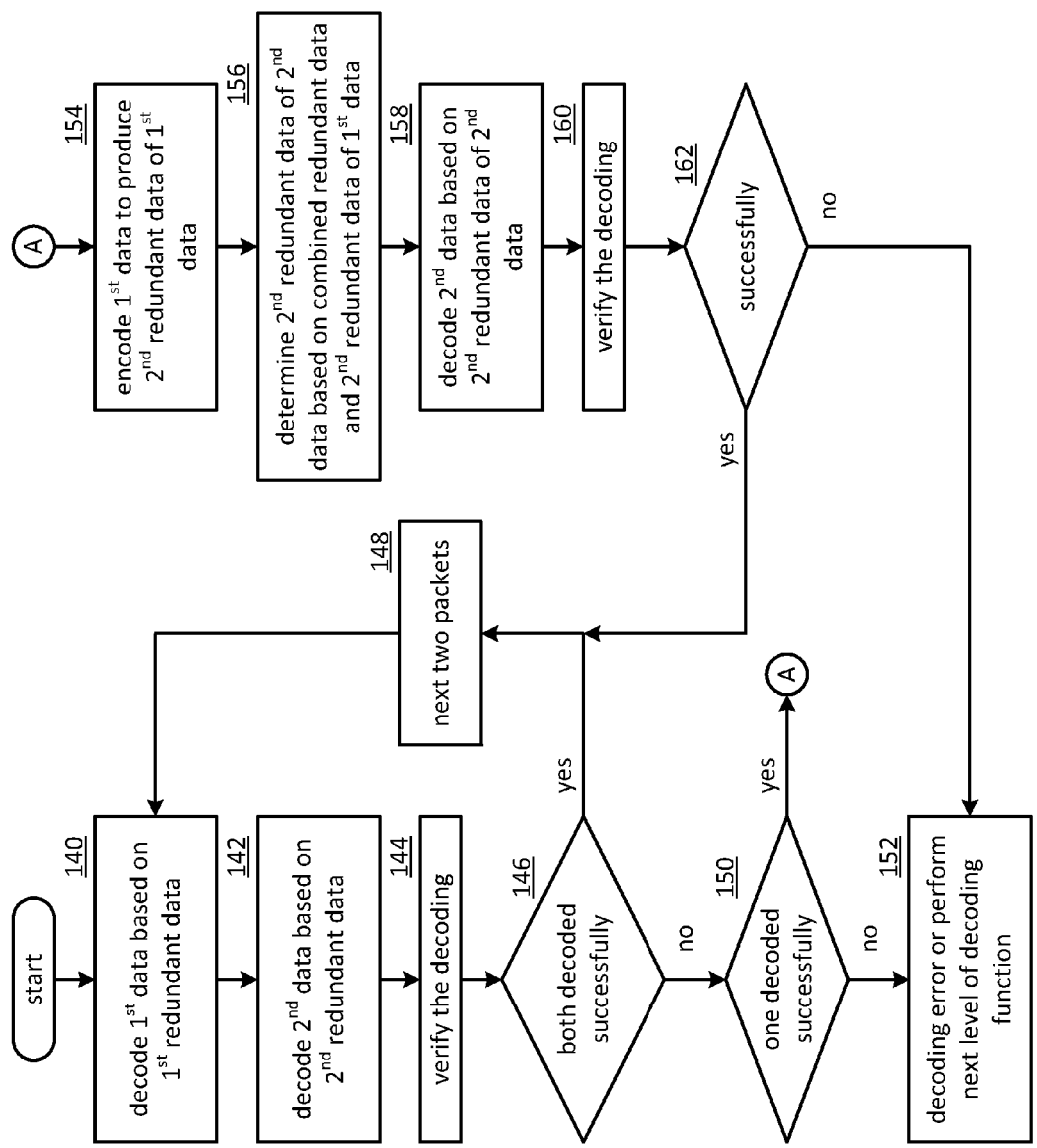
FIG. 9 is a logic diagram of another embodiment of a decoding method in accordance with the present invention.

FIG. 9 is a logic diagram of another embodiment of a decoding method that begins at step 140 where the processing module 18 of the decoder 14 decodes the first encoded packet based on the first redundant data to produce a first decoded packet. The method continues at step 142 where the processing module decodes the second encoded packet based on the second redundant data to produce a second decoded packet. Note that the first and second data may be adjacent packets or non-adjacent packets offset by an offset value (e.g., 2 . . . n). Further note that the first and second redundant data may include convolutional codes.

The method continues at step 144 where the processing module verifies the decoding of the first and second data. This may be done in a variety of ways. For example, the verifying may be part of the decoding function (e.g., Viterbi decoding) and/or a separate verification function. For instance, the inherent and/or separate verification function may be a cyclic redundancy check (CRC), a parity check, a checksum, a Hamming distance based check, a hash function, and/or an error detection function.

The method continues at step 146 where the processing module determines whether both packets were successfully decoded. If yes, the method continues at step 148 wherein the processing module repeats steps 140-144 for another pair of data. If, however, both packets were not decoded successfully, the method continues at step 150 where the processing module determines whether the one of the packets was decoded successfully. If not, the method continues at step 152 where the processing module performs another layer of the decoding function as previously discussed or, if the decoding function has been exhausted, indicates a decoding error for the packets.

If one packet was decoded successfully (e.g., the first packet was decoded successfully and the second packet was not), the method continues at step 154 where the processing module encodes the first decoded packet to produce second redundant data.

For example, the processing module may use an encoding scheme that corresponds to encoding scheme used by the encoder to encode the first and second data and to produce the first and second redundant data.

The method continues at step 156 where the processing module determines a second redundant data for the unsuccessfully decoded packet based on the combined redundant data and the second redundant data of the successfully decoded packet. Examples of this have been previously discussed. The method continues at step 158 where the processing module decodes the second data packet based on the second redundant data to produce a redundant decoded packet. Note that the first and second redundant data may include convolutional codes.

The method continues at step 160 where the processing module verifies the decoding of the second data packet based on the second redundant data. The method continues at step 162 where the processing module determines whether the packet was successfully decoded. If yes, the processing continues at step 148. If not, the process continues at step 152.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A decoder comprises:
  a hardware interface operably coupled to receive one or more packets including first data, redundant data of the first data, second data, redundant data of the second data, and combined redundant data, wherein the combined redundant data is generated based on the redundant data of the first data and the redundant data of the second data; and a processing module operably coupled to:
decode the first data based on the redundant data of the first data to produce a first decoded packet;
decode the second data based on the redundant data of the second data to produce a second decoded packet;
verify the decoding of the first and second data;
when the first data is decoded successfully and the second data is not decoded successfully:
encode the first data to produce second redundant data of the first data;
determine second redundant data of the second data based on the combined redundant data and the second redundant data of the first data;
decode the second data based on the second redundant data of the second data to produce redundant second decoded data; and
verify the decoding of the second data based on the second redundant data of the second data.

2. The decoder of claim 1 further comprises at least one of:
the first and second data are in adjacent packets; and
the first and second data are in non-adjacent packets offset by an offset value.

3. The decoder of claim 1, wherein the processing module is further operably coupled to decode the second data by:
decoding the second data based on the second redundant data of the second data and the redundant data of the second data to produce the redundant second decoded data.

4. The decoder of claim 1, wherein the processing module is further operably coupled to verify the decoding of the first data and the second data by at least one of:
performing a cyclic redundancy check (CRC);
performing a parity check;
performing a checksum;
performing a Hamming distance based check;
performing a hash function; and
performing an error detection function.

5. The decoder of claim 1, wherein at least one of the redundant data of the first or second data, the second redundant data of the first or second data, and the combined redundant data comprises at least one of:
convolutional code based forward redundant data; and
block code based forward redundant data.

6. The decoder of claim 1, wherein the processing module in further operably coupled to:
utilize an encoding scheme to encode the first data to produce the second redundant data of the first data, wherein the encoding scheme corresponds to encoding of the first and second data.

7. The decoder of claim 1, wherein the processing module comprises:
a first register for storing the first data;
a second register for storing the second data;
a third register for storing the redundant data of the first data;
a fourth register for storing the redundant data of the second data;
a fifth register for storing the second redundant data of the first data;
a sixth register for storing the second redundant data of the second data;
a decoding module to:
decode the first data based on the redundant data of the first data to produce the first decoded packet;
decode the second data based on the redundant data of the second data to produce the second decoded packet; and
decode the second data based on the second redundant data of the second data to produce the redundant second decoded data when the first encoded packet is decoded successfully and the second encoded packet is not decoded successfully;
a redundancy module to:
verify the decoding of the first and second data; and
verify the decoding of the second data based on the second redundant data of the second data;
an encoding module to encode the first decoded packet to produce the second redundant data of the first data when the first encoded packet is decoded successfully and the second encoded packet is not decoded successfully; and
an exclusive OR module to determine the second redundant data of the second data based on the combined redundant data and the second redundant data of the first data.

8. The decoder of claim 7, wherein the processing module further comprises:
a seventh register for storing third data;
an eighth register for storing redundant data of the third data;
a ninth register for storing second redundant data of the third data;
the decoding module to further:
decode the third data based on the redundant data of the third data to produce a third decoded packet; and
decode the second data based on at least one of the second redundant data of the first or the third data to produce the redundant second decoded data when the first and third data are decoded successfully and the second encoded packet is not decoded successfully;
a redundancy module to further:
verify the decoding of the third data; and
verify the decoding of the second encoded data based on the second redundant data of the second data;
an encoding module to:
encode the first data to produce the second redundant data of the first data when the first and third data are decoded successfully and the second encoded packet is not decoded successfully; and
encode the third data to produce the second redundant data of the third data when the first and third data are decoded successfully and the second encoded packet is not decoded successfully;
an exclusive OR module to:
determine the second redundant data of the second data based on the combined redundant data and the second redundant data of the first data; or
determine the second redundant data of the second data based on a second combined redundant data and the second redundant data of the third data.

9. The decoder of claim 1, wherein the hardware interface comprises:
a radio frequency (RF) receiver operably coupled to:
receive inbound RF signals; and
recover the first encoded packet, the first redundant data, the second encoded packet, the second redundant data, and the combined redundant data from the inbound RF signals.

10. A decoder comprises:
a hardware interface operably coupled to receive a plurality of data, a plurality of redundant data, and a plurality of combined redundant data, wherein the plurality of combined redundant data is generated based on the plurality of redundant data; and a processing module operably coupled to:

perform a first decoding function on the plurality of data based on the plurality of redundant data, wherein the first decoding function comprises:

decoding the plurality of data based on the plurality of redundant data; and verifying the decoding of the plurality of data; and when the first decoding function does not successfully decode data of the plurality of data, perform a second decoding function on the data of the plurality of data based on a corresponding one of the plurality of combined redundant data.

11. The decoder of claim 10, wherein the processing module comprises:

a decoding module operable to:

decode the plurality of data based on the plurality of redundant data to produce a plurality of decoded packets; and decode the plurality of data based on a recovered second redundant data;

an error detection module operable to:

verify the decoding of the plurality of data based on the plurality of redundant data; and verify the decoding of the data based on the recovered second redundant data;

an encoding module to encode a first one of the plurality of decoded data to produce another second redundant data; and an exclusive OR module to determine the recovered second redundant data based on the corresponding one of the plurality of combined redundant data and the another second redundant data.

12. The decoder of claim 10, wherein the processing module is further operably coupled to:

perform the second decoding function on the data based on the corresponding one of the plurality of combined redundant data and based on a corresponding one of the plurality of redundant data.

13. The decoder of claim 10, wherein the processing module is further operably coupled to:

when the first decoding function does not successfully decode the data of the plurality of data and prior to performing the second decoding function, perform a third decoding function on the encoded packet based on a corresponding one of a plurality of second redundant data; and when the third decoding function does not successfully decode the data of the plurality of data, perform a fourth decoding function on the data based on a corresponding one of a plurality of multiple combined redundant data.

14. The decoder of claim 10, wherein the processing module is further operably coupled to verify the decoding of the plurality of data by at least one of:

performing a cyclic redundancy check (CRC);
performing a parity check;
performing a checksum;
performing a Hamming distance based check;
performing a hash function; and
performing an error detection function.

15. The decoder of claim 10, wherein the hardware interface comprises:

a radio frequency (RF) receiver operably coupled to:
receive inbound RF signals; and
recover the plurality of data, the plurality of redundant data, and the plurality of combined redundant data from the inbound RF signals.

16. An encoder comprises:

a processing module operably coupled to:

receive a first packet and a second packet, and parse data from the first packet and the second packet into a plurality of data;

generate redundant data for each of the data of the plurality of data;

generate second redundant data for each of the data of the plurality of data; and generate combined redundant data based on two or more second redundant data; and a hardware interface operably coupled to transmit the data, the redundant data, and the combined redundant data.

17. The encoder of claim 16 further comprises at least one of:

the two or more second redundant data being associated with adjacent packets; and the two or more second redundant data being associated with non-adjacent packets.

18. The encoder of claim 16, wherein the processing module comprises at least one of:

a convolutional code based forward error correction module operably coupled to generate the redundant data and the second redundant data; and a block code based forward error correction module operably coupled to generate the redundant data and the second redundant data.

19. The encoder of claim 16, wherein the processing module comprises:

an exclusive OR module operably coupled to generate the combined redundant data from the two or more second redundant data.

20. The encoder of claim 16, wherein the interface comprises:

a radio frequency (RF) transmitter operably coupled to:
convert the data, the redundant data, and the combined redundant data into outbound RF signals; and
transmit the outbound RF signals.

* * * * *

UNITED STATES PATENT AND TRADEMARK OFFICE
CERTIFICATE OF CORRECTION

PATENT NO. : 8,335,970 B2  
APPLICATION NO. : 12/632442  
DATED : December 18, 2012  
INVENTOR(S) : Nambirajan Seshadri Page 1 of 1

It is certified that error appears in the above-identified patent and that said Letters Patent is hereby corrected as shown below:

In the Claims:

Col. 13, line 48, in claim 6: replace "in further" with --is further--.

Signed and Sealed this
Twenty-ninth Day of October, 2013

Teresa Stanek Rea
*Deputy Director of the United States Patent and Trademark Office*